US006935366B2

(12) United States Patent
Ciarelli et al.

(10) Patent No.: US 6,935,366 B2
(45) Date of Patent: Aug. 30, 2005

(54) POWDER PAINT COLOR CHANGER

(75) Inventors: Gary J. Ciarelli, Milford, MI (US); Melissa L. Koster, New Hudson, MI (US); Dragoslav K. Milojevic, Bloomfield Hills, MI (US); Christopher M. Rennie, Waterford, MI (US)

(73) Assignee: ABB Inc., Auburn Hills, MI (US)

( * ) Notice: Subject to any disclaimer, the term of this patent is extended or adjusted under 35 U.S.C. 154(b) by 0 days.

(21) Appl. No.: 10/941,779

(22) Filed: Sep. 15, 2004

(65) Prior Publication Data

US 2005/0028867 A1 Feb. 10, 2005

Related U.S. Application Data

(60) Division of application No. 10/614,682, filed on Jul. 7, 2003, which is a continuation-in-part of application No. 09/824, 555, filed on Apr. 2, 2001, now Pat. No. 6,589,342.

(51) Int. Cl.[7] .......................... F16K 11/22; B05B 7/24

(52) U.S. Cl. ................ 137/565.01; 137/240; 137/266; 239/112; 239/305

(58) Field of Search ................................ 137/240, 266, 137/565.01, 884; 239/112, 113, 305, 307

(56) References Cited

U.S. PATENT DOCUMENTS

| | | | | |
|---|---|---|---|---|
| 3,777,874 A | | 12/1973 | Birckhead | |
| 4,248,379 A | | 2/1981 | Hollstein et al. | |
| 4,302,481 A | | 11/1981 | Ribnitz et al. | |
| 4,380,321 A | | 4/1983 | Culbertson et al. | |
| 4,700,896 A | * | 10/1987 | Takeuchi et al. | 239/113 |
| 4,928,880 A | * | 5/1990 | Prus et al. | 239/112 |
| 4,993,353 A | | 2/1991 | Ogasawara et al. | |
| 5,102,046 A | | 4/1992 | Diana | |
| 5,215,261 A | | 6/1993 | Frene | |
| 5,256,201 A | * | 10/1993 | Gelain et al. | 118/326 |
| 5,288,525 A | | 2/1994 | Diana | |
| 5,743,958 A | | 4/1998 | Shutic | |
| RE35,883 E | | 9/1998 | Konieczynski | |
| 5,813,608 A | | 9/1998 | Yoshioka et al. | |
| 6,010,084 A | | 1/2000 | Yoshida et al. | |
| 6,050,498 A | | 4/2000 | Minoura et al. | |
| 6,051,280 A | | 4/2000 | Seitz et al. | |
| 6,071,348 A | | 6/2000 | Seitz et al. | |
| 6,080,217 A | | 6/2000 | Gobl et al. | |
| 6,090,450 A | | 7/2000 | Kahmann et al. | |
| 6,099,898 A | | 8/2000 | Joyce et al. | |
| 6,112,999 A | | 9/2000 | Fingleton et al. | |
| 6,223,997 B1 | | 5/2001 | Fulkerson et al. | |
| 6,589,342 B2 | | 7/2003 | Attinoto et al. | |
| 6,705,545 B1 | * | 3/2004 | Sroka et al. | 239/305 |

* cited by examiner

*Primary Examiner*—Kevin Lee
(74) *Attorney, Agent, or Firm*—Harness, Dickey & Pierce, P.L.C.

(57) ABSTRACT

A powder paint color changer features a single cleaning fluid port at one end of the color changer manifold for direction of cleaning fluid, such as pressurized air, through the main output interior chamber of the color changer manifold thence through a supply hose which is adapted for coupling to a paint application device. Additionally, the powder paint color changer manifold includes a replaceable insert of impact fusion resistant material which defines the surface of the manifold's interior cavity.

4 Claims, 6 Drawing Sheets

POWDER PAINT COLOR CHANGER

CROSS-REFERENCE TO RELATED APPLICATIONS

This application is a division of U.S. patent application Ser. No. 10/614,682 filed Jul. 7, 2003, which is a continuation-in-part of U.S. patent application Ser. No. 09/824,555 filed on Apr. 2, 2001, and now U.S. Pat. No. 6,589,342, the disclosures of which are incorporated herein by reference.

BACKGROUND OF THE INVENTION

The invention relates to paint color changers for paint application systems. More particularly, the invention concerns a powder paint color changer adapted for use with paint application systems utilizing solid particulate paint particles entrained in a fluid such as air.

Paint color changers are known in the art for both liquid and powder paint applications. In liquid paint applications, the color changers are positioned as closely as possible to the paint application apparatus to save on solvent and paint waste. For powder applications, it has been found better to place the color changers closer to the source of the powder paint rather than to the application device.

In the typical powder paint application, pressurized air is used as a diluter and carrier of the powder paint particles to the application device via a color changer. Unlike the liquid paint application, powder applications do not utilize cleaning solvents. The transport air is a neutral means of transporting the powder such that the powder paint is very diluted in the hoses connecting the various apparatus of the system, and its amount is relatively small. These characteristics are what suggest placing the powder color changer closer to the feed hoppers rather than as close as possible to the paint applicator as is the case for liquid paint applications. This feature helps to reduce the number and length of powder feeding hoses in a multiple color system.

In prior art powder paint color changers, such as those disclosed in U.S. Pat. No. 4,302,481 to Ribnitz, et al., where multiple colors enter a common color changing manifold, separate air purging channels are required for each manifold powder paint input. This complicates the color changing arrangement thereby adding expense.

Another problem with powder paint applications is the phenomenon known as impact fusion. Impact fusion occurs where the particles of powder paint encounter surfaces in prior art color change manifolds having relatively high friction surfaces thereby leading to powder particle agglomeration and adhesion to the color changer surfaces. Such adhesion, in turn, leads to problems in both cleaning of the apparatus prior to changing colors and may, over time, lead to inoperativeness of the color changer due to clogging of various passageways therein.

Therefore, there is a need in the art for a color changer for powder paint applications providing facile cleaning and resistance to particulate impact fusion at powder paint carrying surfaces therein.

SUMMARY OF THE INVENTION

Accordingly, the present invention provides a powder paint color changer for implementation with a powder paint application device. The powder paint color changer includes a hollow body portion having first and second ports, the first port in fluid communication with a source of cleaning fluid and the second port in fluid communication with the powder paint application device, a plurality of change valves each having an outlet in fluid communication with an interior cavity of the hollow body portion and each having an inlet, whereby each change valve is operative in a first mode to enable fluid communication between the inlet and the outlet and operative in a second mode to prohibit fluid communication between the inlet and the outlet, a plurality of purge valves corresponding to each of the plurality of change valves, each of the purge valves including an outlet in fluid communication with each inlet of the corresponding change valve and further including an inlet and a purge port, the purge port in fluid communication with a source of cleaning fluid and a plurality of color valves corresponding to each of the plurality of purge valves. Each of the color valves has an outlet in fluid communication with each inlet of the corresponding purge valve and has an inlet in fluid communication with a source of powder paint.

The present invention further provides a method of operating a powder paint applicator including the steps of: providing a powder paint color changer assembly for selectively supplying a particular powder paint to the powder paint applicator, providing a pump in fluid communication with an outlet of the powder paint color changer and the powder paint applicator and selectively enabling a flow of conveying fluid through the pump for providing a suction force through the powder paint color changer assembly for drawing the particular powder paint through the powder paint color changer assembly and into the pump for further conveyance to the powder paint applicator by the conveying fluid.

BRIEF DESCRIPTION OF THE DRAWINGS

The objects and features of the invention will become apparent from a reading of a detailed description taken in conjunction with the drawing, in which.

DETAILED DESCRIPTION

Figure 1:
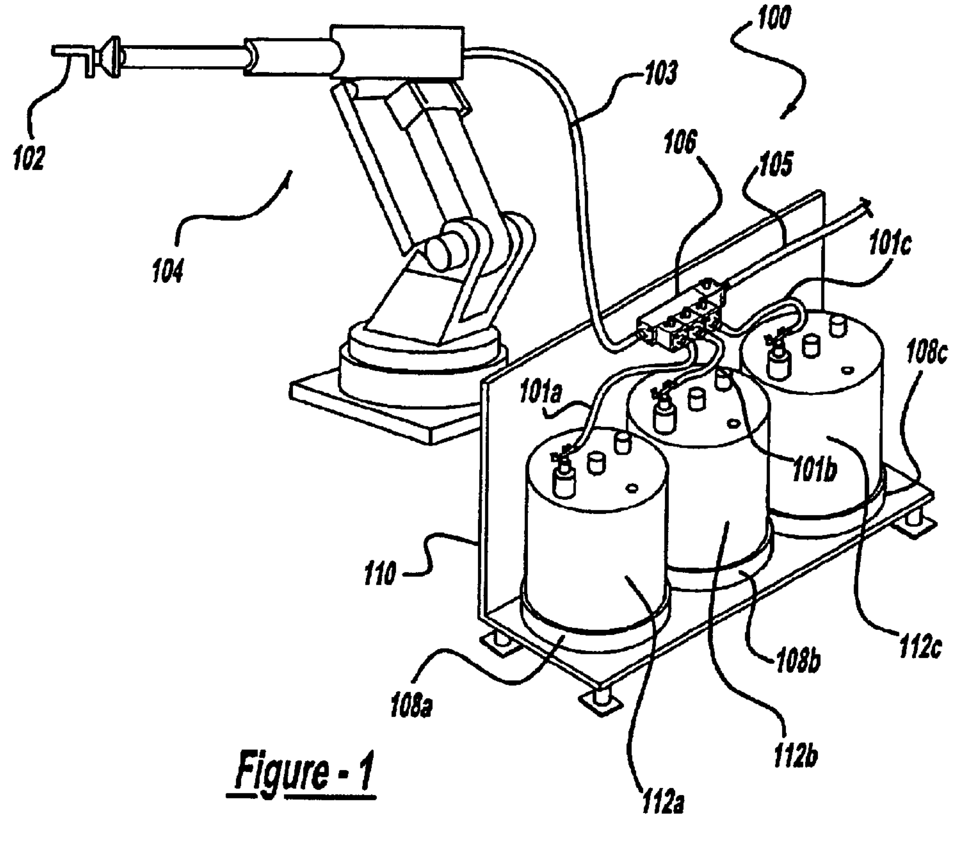
FIG. 1 is a perspective view of a powder paint application system arranged in accordance with the principles of the invention.

With reference to FIG. 1, a powder paint application system 100 includes a paint applicator 102 which is mounted to a robot assembly 104. However, it is to be understood that the color changer principles of this invention apply equally well to a manual system or a permanently mounted paint application gun.

The paint applicator 102 is supplied with air-borne powder paint through a connecting hose 103 extending from a color changer 106 mounted to a portion of a support platform 110. The hose 105 couples a source of cleaning fluid, such as air, to the color changer 106. Additionally, resting upon a substantially horizontal surface of the support 110 are a plurality of powder feeding hoppers 112*a*, 112*b* and 112*c*. While three hoppers are shown, it will be apparent to those skilled in the art that any number of hoppers may be accommodated by a color paint changer 106 arranged in accordance with the principles of this invention. In this description and the appended claims, “plurality” is used in the normal sense, meaning two or more.

Each powder feeding hopper 112 contains a different paint powder supply and an output of each hopper 112 is coupled via respective supply hoses 101*a*, 101*b* and 101*c* to input ports of the color changing device 106 to be described in more detail below. The powder material in the feeding hoppers 112 is fluidized by air through porous bottom plates (not shown) so that the powder material can be pneumatically conveyed to the paint applicator 102.

Each powder feeding hopper 112*a*, 112*b* and 112*c* rests upon a weighing scale 108*a*, 108*b* and 108*c*, respectively, that are used to detect an empty or near-empty hopper, or to effectively measure the flow rate of the powder paint product during a predetermined time period. Additionally, outputs of the scales 108 can be used in a closed-loop paint application control system in monitoring such things as paint flow rate and the amount of paint used in a particular application sequence.

With the arrangement shown in FIG. 1, the powder feeding hoppers 112 mounted to their respective weighing scales 108 on support 110 can be placed at any desired position with respect to the robot assembly 104. Additionally, it will be noted that the paint supply hoses 101*a*, 101*b* and 101*c* at the hopper outputs may be minimized in length, as the paint supply hoppers 112 are located relatively close to the color changing apparatus 106.

Figure 2:
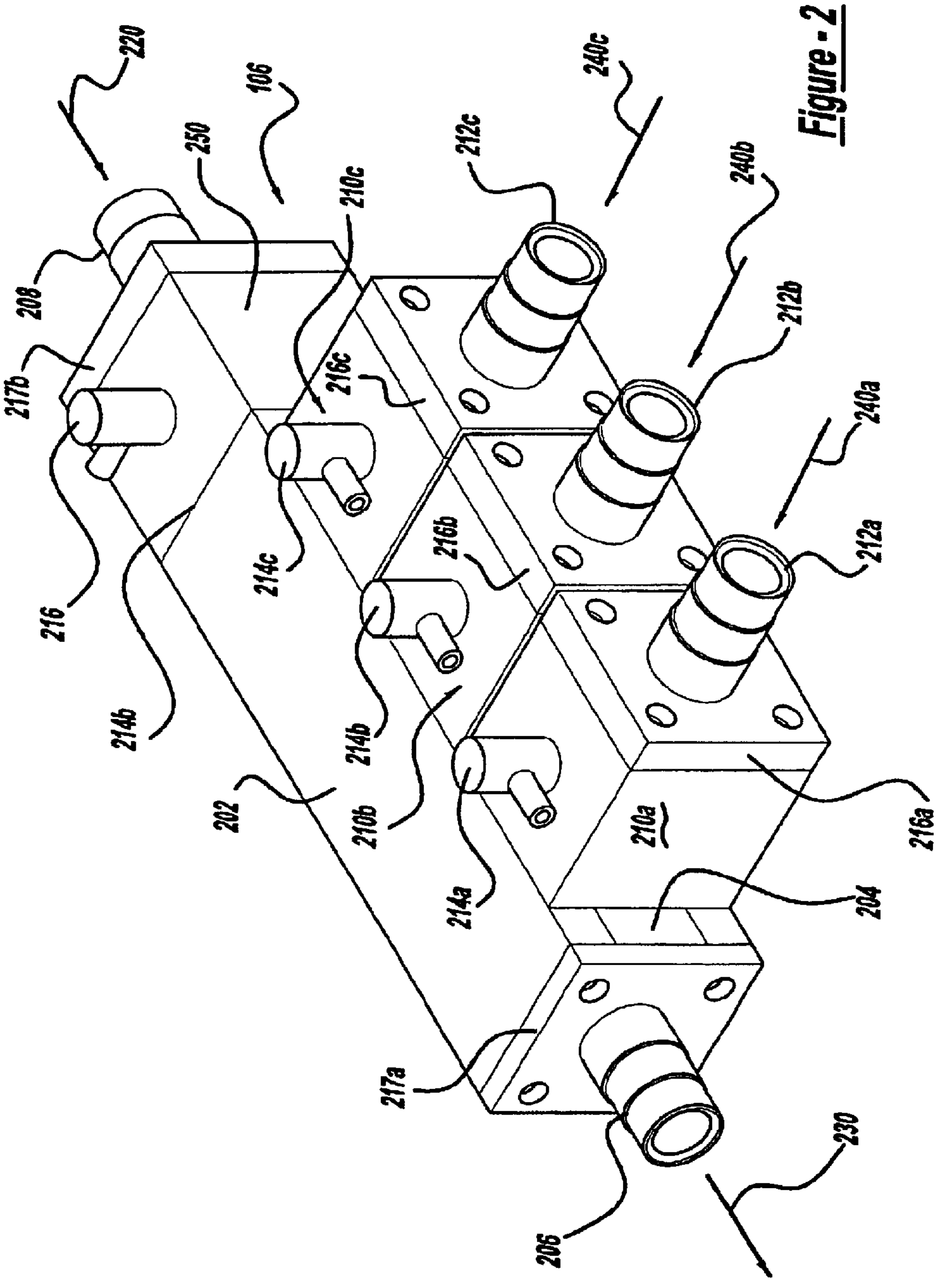
FIG. 2 is a perspective view of a powder paint color changer device arranged in accordance with the principles of the invention and adapted for use in the system of FIG. 1.
Figure 3:
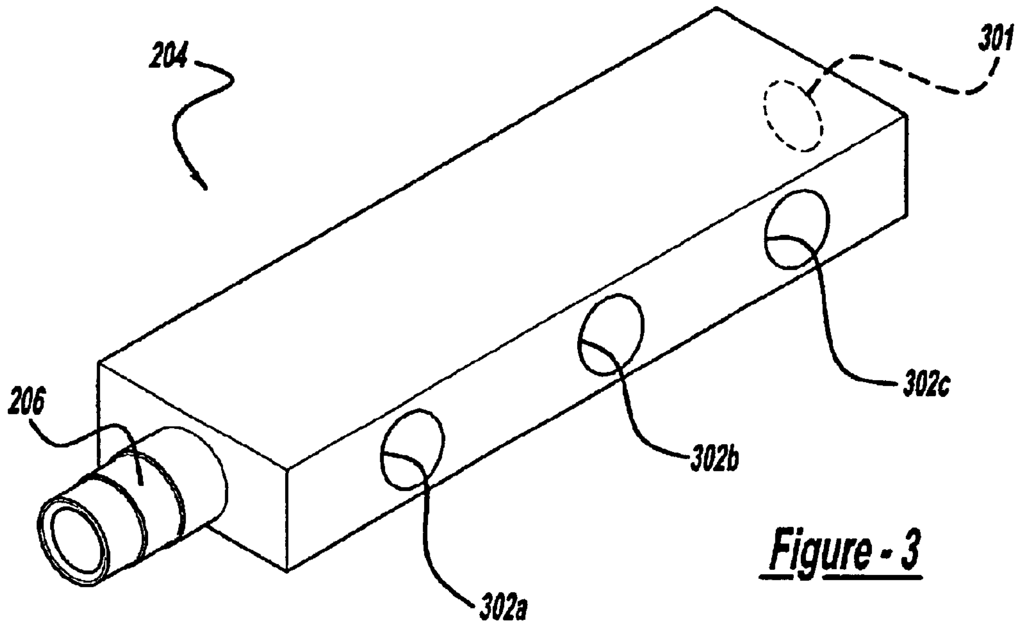
FIG. 3 is a perspective view of a replaceable insert portion of the color changer of FIG. 2.

With reference to FIGS. 2 and 3, the details of the color changer 106 are set forth. The color changer 106 utilizes a hollow body member or manifold 202 having an interior cavity (not specifically shown in FIG. 2) which is utilized to transfer powder paint from one of several color sources to a common outlet port 206 attached by a face plate 217*a* to the manifold 202.

An oppositely facing end cap 217*b* of the manifold 202 provides an inlet port 208 adapted to be coupled to a source of cleaning fluid, such as pressurized air. The port 206 is conveniently formed as a hose barb, as shown, while the port 208 utilizes a quick disconnect coupling to the cleaning fluid source.

Interposed between the end cap 217*b* and the manifold 202 is a valve 250 which, in this embodiment, comprises a pinch valve known to those skilled in the art. Such pinch valves are pneumatically operated via a compressed air port 216. As is known in the art, the interior of the pinch valve basically comprises a flexible cylinder, such as fashioned from a rubber product, surrounded by an activation chamber which, upon receipt of pressurized air, closes the flexible column thereby interrupting fluid communication between an input and an output of the pinch valve.

Mounted linearly along one side of the manifold 202 are a plurality, in the present embodiment three, similar pinch valve assemblies 210*a*, 210*b* and 210*c*. The valves 210*a*, 210*b* and 210*c* are respectively equipped with pneumatic activation ports 214*a*, 214*b* and 214*c* and are coupled to the manifold 202 via suitable mounting bolts that are accessible from cover plates 216*a*, 216*b* and 216*c*, respectively.

At the inlet to each of the valve assemblies 210*a*, 210*b*, 210*c* are suitable hose barbs 212*a*, 212*b* and 212*c* respectively adapted for coupling to the supply hoses 101*a*, 101*b*, 101*c* leading from the powder feeding hoppers 112*a*, 112*b* and 112*c*.

To minimize impact fusion along the surface of the interior cavity of the manifold 202, the manifold 202 includes two pieces. The first is of a suitable metal, such as steel or aluminum, which extends along appropriate surfaces of manifold 202 to enable strong coupling via, for example, bolts of the various pinch valve assemblies and end caps 214. Forming the inner surface of the interior cavity of manifold 202 is a low friction material 204, such as a plastic. Suitable plastics have been found to comprise polytetrafluorethylene (for example PTFE or Teflon) or other commercially available plastics such as polyoxymethylene (known as Acetal, Delrin and POM). The necessary property for the material of piece 204 of manifold 202 is that it is resistant to impact fusion between the surface of the material and the powder paint particles which may impinge thereon. Another way of stating the desired characteristic of the material of insert 204 is that it exhibits low surface friction.

For ease of replacement, the impact-fusion resistant material 204 is formed as a replaceable insert member of manifold 202. An exemplary insert 204 is set forth in the perspective view of FIG. 3. It will be noted from FIG. 3, that output port hose barb 206 is of the same material as insert 204 and, is preferably formed as an integral portion thereof. Additionally, as seen from FIG. 3, insert 204 is provided with inlet ports 302*a*, 302*b* and 302*c* along a lateral surface of insert 204 wherein ports 302 are respectively aligned with outputs of pinch valve assemblies 210*a*, 210*b* and 210*c* of FIG. 2. An end portion of the interior cavity that extends along a longitudinal axis of insert 204 (and therefore a longitudinal axis of manifold 202), is seen in phantom at 301 of FIG. 3. The port 301 in the insert 204 is substantially aligned and in fluid communication with an output of the pinch valve 250 of FIG. 2.

It will be seen by those skilled in the art that insert 204 provides an impact fusion resistant surface for the main cavity of manifold 202 while simultaneously being fashioned in a form which makes insert 204 easily replaceable in the event that substantial use renders its surfaces unacceptable for further powder paint transmission to an application device.

An additional salient feature of the color changer 106 of FIG. 2 is the provision of a single cavity inlet port 208 that is substantially aligned with a longitudinal axis of the cavity at one end of manifold 202 and communicates with the cavity via a suitable valve such as pinch valve 250. This arrangement eliminates the need for providing separate air purge channels for each color inlet to the manifold.

Figure 4:
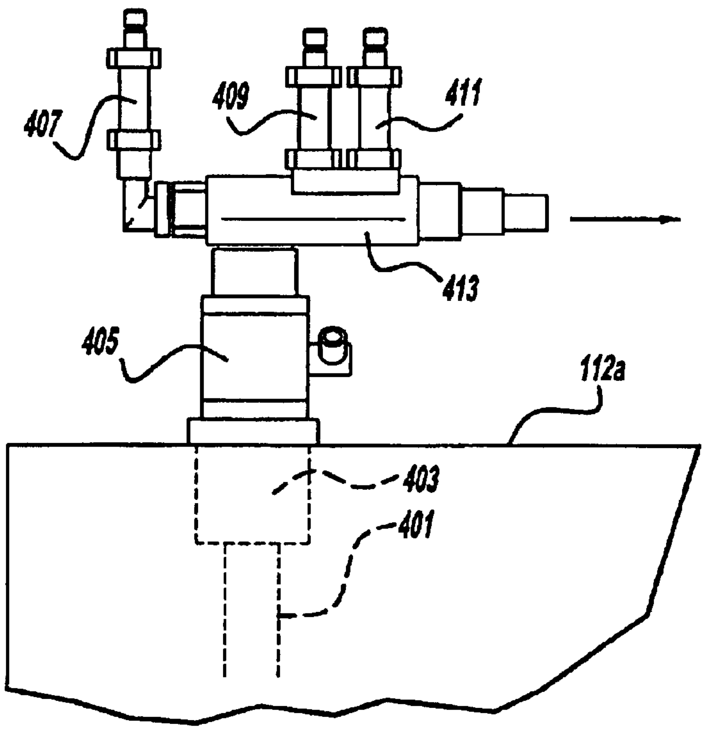
FIG. 4 sets forth more details of the output apparatus of the powder paint hopper used in the system of FIG. 1.

FIG. 4 sets forth pertinent details at the powder paint outlet of powder feeding hoppers 112 of FIG. 1. With reference to FIG. 4, the powder feeding hopper 112*a* has a powder paint output 401 coupled to the supply hose 101*a* (FIG. 1) leading to the color changer 106 via a quick disconnect coupling 403 and a pinch valve 405. The pinch valve 405 is coupled to an outlet tube 413 which is supplied with a pressurized fluid by a conveying air inlet 407, along with supplemental fluid at inlets 409 and 411. The supplemental fluid is conventionally used for dilution and mixing as the powder paint particles are entrained in the conveying fluid flow for supplying the color changer 106 of FIG. 2. In this manner, the powder paint particles are drawn upward form the hopper via a created suction force and are blown forward through the remaining components of the system 100.

With the arrangement as set forth in FIGS. 1–4, the prior disadvantage of the air connector on the injection pumps directing powder paint out of the powder feeding hoppers being relatively small and therefore not ordinarily allowing enough air flow and pulse strength to clean a supply line all the way from the feed injection pump to the paint applicator, is overcome. This problem is resolved by placing the powder color changer 106 relatively close to the powder feeding hoppers 112 (FIG. 1) thereby enabling the relatively low volume air supply at inlet 407 to sufficiently purge the powder hopper supply line 101 between the hopper 112 and the color changer 106. The interior cavity of the manifold 202 itself, along with supply line 103 (FIG. 1) leading from the output of the color changing manifold 202 to the paint application device is purged and cleaned in a separate step via the cleaning fluid supply coupled to manifold input 208.

To summarize, with reference to FIGS. 1–4, the overall system operation in terminating the powder paint application, cleaning the various supply lines and switching to a new color for the next application is, as follows. When application of powder paint to a workpiece via the paint applicator 102 is finished, powder paint transmission to the paint applicator 102 via the color changer 106 is terminated by first stopping the conveying air and closing pinch valve 405 (FIG. 4) at the outlet of the powder feeding hopper 112 (FIG. 1) in current use. During the preceding application interval, the hopper 112 in use supplies paint via its corresponding input pinch valve 210 of FIG. 2 to the manifold 202, which, in turn, directs powder paint from manifold outlet 206 via the supply hose 103 to the paint applicator 102 of FIG. 1.

Upon closure of the hopper outlet pinch valve 405, purging air from the injector pump sources 407, 409 and 411 is directed, either in a continuous or in a pulsating manner, through the corresponding supply line 101 via the outlet section 413 to purge the paint particles from the supply line 101, up to the interior cavity of the manifold 202 of the color changer 106. At the conclusion of the hopper supply line purging operation, the injector pump associated with the hopper in previous use is disabled, the corresponding inlet pinch valve 210 closed and the cleaner pinch valve 250 is opened, thereby establishing fluid communication between a cleaning fluid source coupled to the manifold inlet 208 and the interior cavity of manifold 202. Cleaning fluid, either continuous or pulsating pressurized air, is then directed through the interior cavity of the insert 204 of the color changer 106 via the output 206 through supply line 103 and up through the dispensing mechanism 102 to provide cleaning of this portion of the paint delivery system.

At the conclusion of this purging step, a new workpiece is positioned with respect to the paint applicator 102, a color is selected which, in turn, determines which powder feeding hopper 112 will be used in the subsequent application step. The cleaning pinch valve 250 is closed, and the pinch valve 405 of the appropriate hopper and pinch valve 210 of the corresponding inlet valve is opened in preparation for delivering powder paint via an injector pump at 407 through the color changing manifold 202 to application device 102.

As mentioned above, this whole process may be conducted in a closed-loop manner in a variety of ways utilizing information derived from the outputs of weighing scales 108*a*, 108*b* and 108*c* respectively associated with powder feeding hoppers 112*a*, 112*b* and 112*c* of FIG. 1. The closed loop control process involves comparing the actual powder flow rate (obtained through use of the weighing scales 108*a*, 108*b*, 108*c*) with the desired powder flow rate. Control calculations are performed via internal algorithms (within an automatic control device) and adjustments are made to the main injector pump air source 407 and supplemental air sources 409, 411. These adjustments correct for any variance in powder flow rate that may occur over the spraying period, due to any disturbances in the process.

With reference to FIGS. 5 through 8, an alternative embodiment of a paint application system 100' is detailed. The paint application system 100' includes a powder applicator 102' which is mounted to a robot assembly 104'. Again, it is to be understood that the color changer principles of the present invention apply equally well to a manual system or a permanently mounted paint applicator gun 102'.

The paint applicator 102' is supplied with air-borne powder paint through connecting hose 103' extending from a pump 500 operably interconnected to a color changer 106'. The color changer 106' is mounted to a portion of a support platform 110'. A hose 105' couples a source of cleaning fluid (not shown), such as air, to the color changer 106'. Additionally, resting upon a substantially horizontal surface of the support 110' are a plurality of powder feeding hoppers 112*a*', 112*b*' and 112*c*'. While three hoppers are shown, it will be apparent to those skilled in the art that any number of hoppers may be accommodated by a color paint changer arranged in accordance with the principles of the present invention.

Each powder feeding hopper 112' contains a different paint powder supply and an output of each hopper is coupled via a supply hose 101*a*', 101*b*' and 101*c*' to input ports of the color changing device 106' to be described in more detail below. The powder material in the feeding hoppers is fluidized by air through porous bottom plates (not shown) so that the powder material can be pneumatically conveyed by means of feeding injector pumps through color change valves to the paint application devices.

Each powder feeding hopper 112*a*', 112*b*' and 112*c*' rests upon a weighing scale 108*a*', 108*b*' and 108*c*', respectively, which may be used to detect an empty or near-empty hopper, or can be used to effectively measure the flow rate of the powder paint product during a predetermined time period. Additionally, outputs of the scales 108' can be used in a closed-loop paint application control system in monitoring such things as paint flow rate and the amount of paint used in a particular application sequence.

Figure 5:
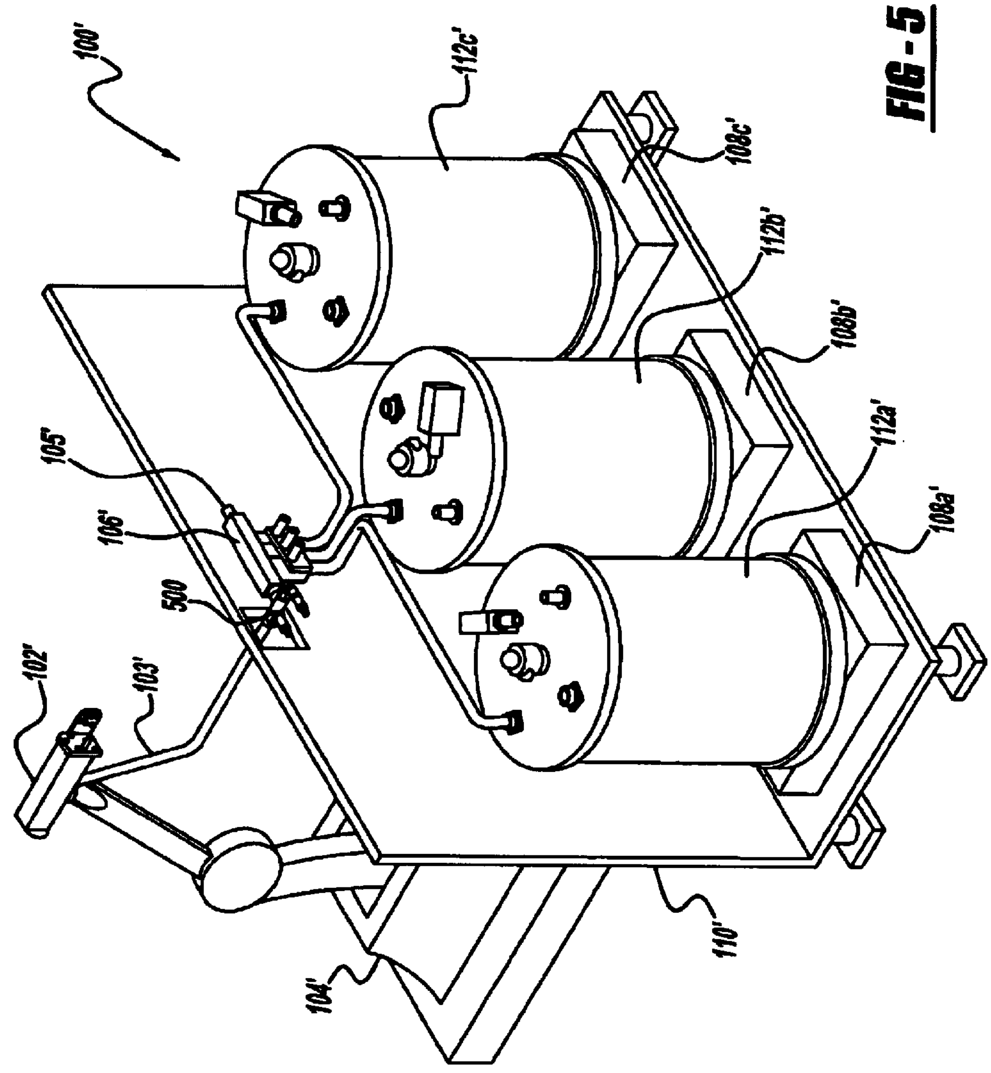
FIG. 5 is a perspective view of an alternative powder paint application system arranged in accordance with the principles of the invention.

With the arrangement shown in FIG. 5, the powder feeding hoppers 112' mounted to their respective weighing scales 108' on the support 110' can be placed at any desired position with respect to the paint applicator 102'. Additionally, it will be noted that the paint supply hoses 101*a*', 101*b*' and 101*c*' at the hopper outputs may be minimized in length, as the paint supply hoppers 112' are located relatively close to the color changer 106'.

Figure 7:
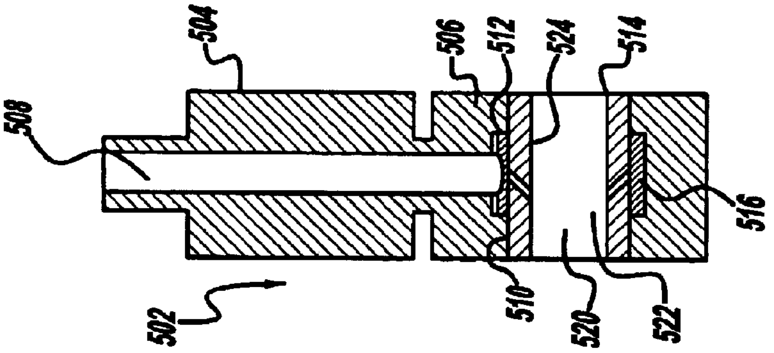
FIG. 7 is a cross-sectional view of a purge block of the powder paint color changer device of FIG. 6.
Figure 6:
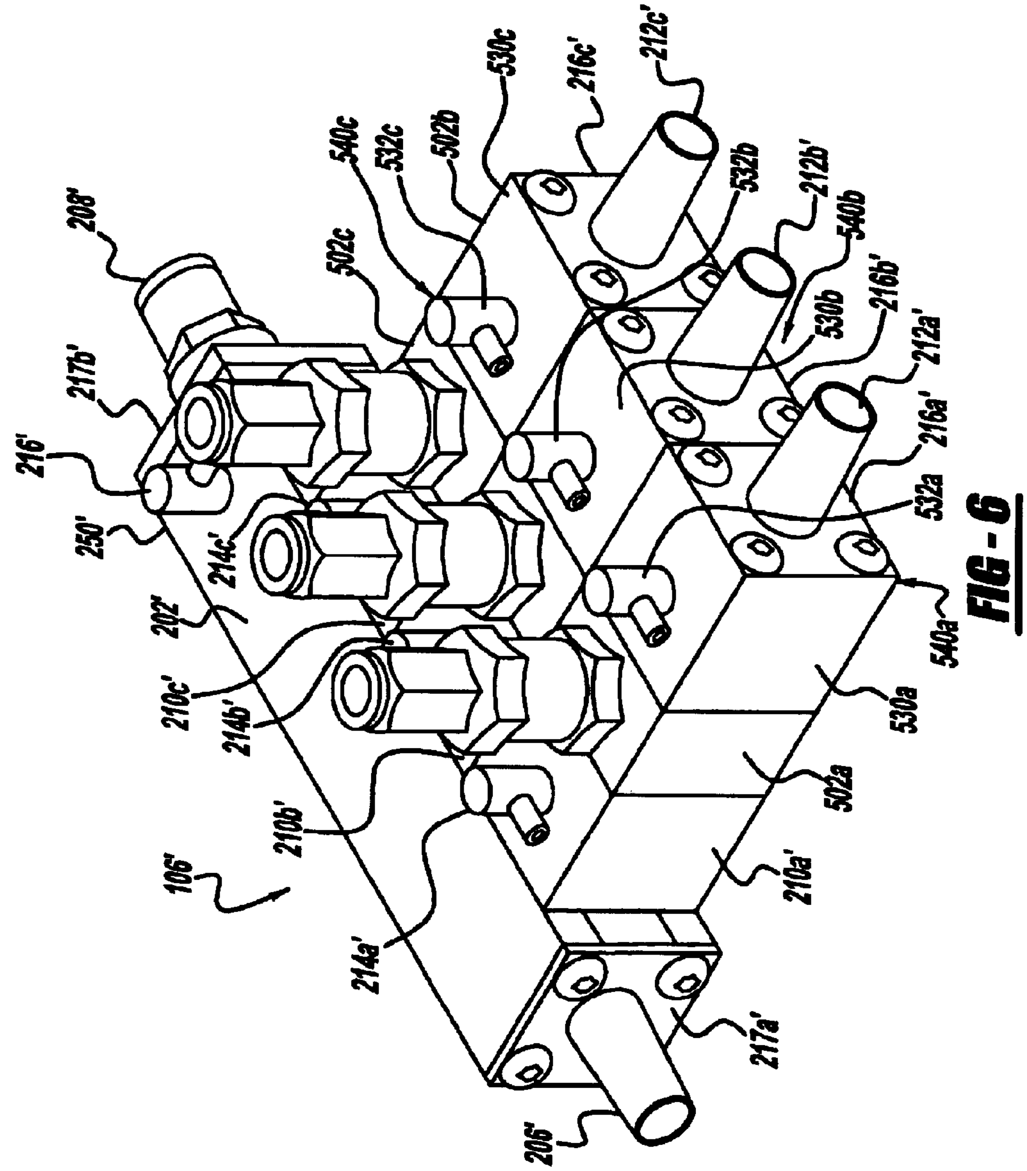
FIG. 6 is a perspective view of an alternative powder paint color changer device arranged in accordance with the principles of the invention and adapted for use in the system of FIG. 5.
Figure 8:
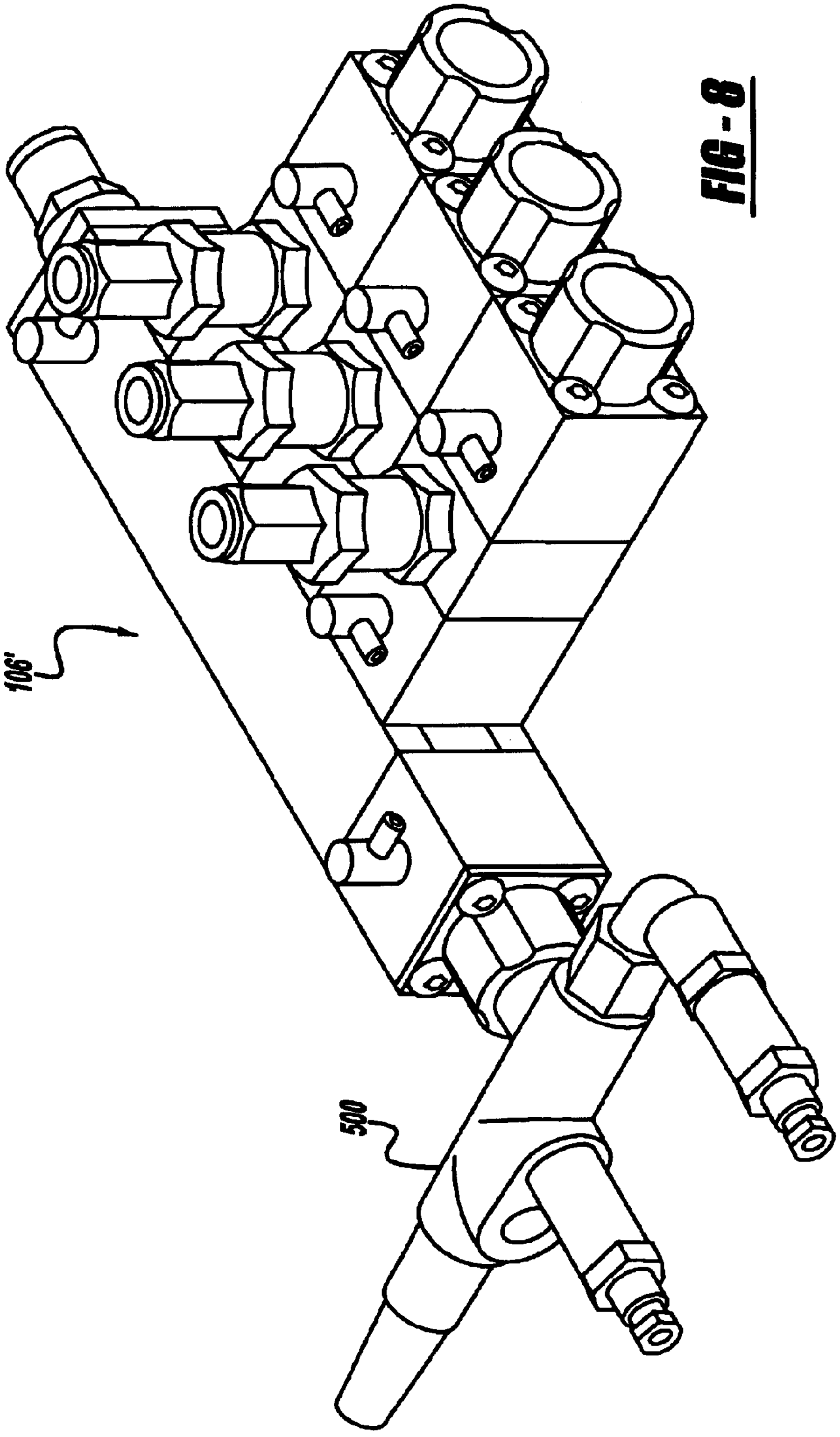
FIG. 8 is a more detailed perspective view of the powder paint color changer device including an injection feed pump.

With reference to FIGS. 6 through 8, the details of the color changer 106' are set forth. It will be appreciated that the color changer 106' is similarly constructed to the color changer 106 described in detail above with reference to FIGS. 1–4. The color changer 106' utilizes a hollow body member or manifold 202' having an interior cavity (not shown) which is utilized to transfer powder paint from one of the several hoppers to a common outlet port 206' attached by a face plate 217*a*' to the manifold 202'. An oppositely facing end 217*b*' of the manifold 202' provides an inlet port 208' adapted to be coupled to a source of cleaning fluid (not shown), such as pressurized air. The port 206' is conveniently formed as a hose barb, as shown, while the port 208' preferably utilizes a quick-disconnect coupling to the source of cleaning fluid.

Interposed between the end cap 217*b*' and the manifold 202' is a valve 250', which preferably comprises a pinch valve commonly known in the art. Such pinch valves are pneumatically operated via a compressed air port 216'. As is known in the art, the interior of the pinch valve generally comprises a flexible cylinder, such as fashioned from a rubber product, surrounded by an activation chamber which, upon receipt of pressurized air, closes the flexible column, thereby interrupting fluid communication between an input and an output of the pinch valve.

Mounted linearly along one side of the manifold 202' are a series of intermediate pinch valves 210*a*', 210*b*' and 210*c*'. The intermediate pinch valves 210*a*', 210*b*', 210*c*' are respectively equipped with pneumatic activation ports 214*a*', 214*b*' and 214*c*'. Mounted adjacent to the intermediate pinch valves 210*a*', 210*b*', 210*c*' are a series of purge fittings 502*a*, 502*b*, and 502*c*, respectively associated with each intermediate pinch valve 210*a*', 210*b*', 210*c*'. With particular reference to FIG. 7, the purge fittings 502 each include a check valve 504 interconnected to a purge block 506. The check valve 504 includes a passage 508 running therethrough, which is in fluid communication with a passage 510 of the purge block 506. The passage 510 of the purge block 506 includes an intermediate recess portion 512. An insert 514 is received into the passage 510 of the purge block 506 thereby defining a cavity 516 in association with the intermediate recess portion 512.

The insert 514 is preferably formed from a low friction material, such as plastic. Suitable plastics have been found to comprise polytetrafluorethylene (e.g. PTFE or Teflon) or other commercially available plastics such as polyoxymethylene (i.e. Acetal, Delrin and POM). The necessary property for the insert 514 is that it is resistant to impact fusion between the surface of the material and powder paint particles which may impinge thereon (i.e. includes a low coefficient of friction). The insert 514 further includes a passage 520 therethrough and a series of orifices 522 running angularly through a wall 524 thereof. The orifices 522 enable fluid communication between the cavity 516 of the purge block 506 and the passage 520 of the insert 514, as explained in further detail hereinbelow.

A series of secondary pinch valves 530*a*, 530*b* and 530*c*, are mounted adjacent to and respectively associated with the purge fittings 502*a*, 502*b*, 532*c*. The secondary pinch valves 530*a*, 530*b*, 530*c* are respectively equipped with pneumatic activation ports 532*a*, 532*b*, 532*c* (FIG. 6).

The intermediate pinch valves 210', the purge fittings 502 and the secondary pinch valves 530 are assembled adjacent one another for defining separate color change assemblies 540*a*, 540*b* and 540*c* having a fluid passage therethrough, which is selectively closable implementing either the associated intermediate pinch valve 210' or secondary pinch valve 530. The color change assemblies 540 are coupled to the manifold 202' via suitable mounting bolts accessible from respectively associated cover plates 216*a*', 216*b*' and 216*c*'. At the inlet to each of the color change assemblies 540 are suitable hose barbs 212*a*', 212*b*' and 212*c*', respectively formed from the cover plates 216*a*', 216*b*', 216*c*' and respectively adapted for coupling with supply lines 101*a*', 101*b*' and 101*c*' leading from the hoppers 112*a*', 112*b*' 112*c*' (FIG. 5).

It will further be appreciated that the manifold 202' of the alternative embodiment is similarly constructed as the manifold 202 described in detail above, preferably including the material insert 204. Therefore, detailed description of the manifold 202' will be foregone.

In operation, a single color is initially chosen for application to a product through the paint applicator 102'. Having chosen the color, the intermediate pinch valves 210' associated with the other color change assemblies 540 are closed. Conveying air is driven through the pump 500 (FIG. 8), thereby generating a suction force at the outlet port 206' of the manifold 201'. The suction force draws the powder paint from the hopper 112' (FIG. 5) associated with the presently open color change assembly 540. Thus, the powder paint is drawn up from the hopper 112', through the color change assembly, through the manifold 201', and into the pump 500. As the powder paint is drawn into the pump 500, a conversion takes place, whereby the conveying air flowing through the pump pushes the powder paint through the hose 103' and out the paint applicator 102'. As a result of the pump 500 being disposed on the suction side of the color changing device 106', the powder paint flow that is drawn through the associated components tends to be denser than if the powder paint was pushed through the associated components by the conveying air. In this manner, impact fusion within the components such as the manifold 102' and the purge fittings 502, is significantly reduced.

When a color change is required, the conveying air is stopped from flowing through the pump 500, thereby ceasing the suction force through the color changing device 106'. The secondary pinch valve 530 associated with the recently applied color is closed and purging air is introduced through the purge fitting 502 for cleaning out the color change assembly 540. Cleaning of the color change assembly 540 lasts approximately 0.5 to 1 second and afterward, the intermediate pinch valve 210' is closed. After closing of the intermediate pinch valve 210', the manifold pinch valve 250' is opened and purging air is conveyed from the inlet 208' for cleaning the manifold 202', the pump 500 and the hose 103' up through the paint applicator 102'. This process lasts approximately 8 to 10 seconds or less, depending upon the length of the hose 103'. Upon completion of this process, the purging air is switched off and the manifold pinch valve 250' is closed.

After purging the system 100' of the previously applied powder paint particles, the intermediate and secondary pinch valves 210', 530 associated with the next desired color are opened and the others are closed. Conveying air is again driven through the pump 500, thereby generating the suction force for drawing the next color powder paint through the color changing device 106'.

It should be noted that the alternative embodiment includes only a single pump 500 for transporting the powder paint through the system 100'. In this manner, a reduced number of components is achieved, thereby reducing cost and complexity. Further, the pump 500 is advantageously located for reducing the occurrence of impact fusion, as discussed above.

A powder paint dispensing and color changing system arranged in accordance with the principles of this invention will therefore be seen to provide modularity, ease of fabrication and facile maintenance and inspection of parts for such problems as impact fusion on surfaces thereof.

The invention has been described in conjunction with the detailed description of a preferred embodiment for the sake of example only. The scope and spirit of the invention are as set forth in the appended claims.

What is claimed is:

1. A powder paint color changer for use with a powder paint application device, comprising:

an elongate manifold having an interior cavity extending along a longitudinal axis thereof and including an inlet adapted to be in fluid communication with a source of cleaning fluid;

a pump operably interconnected with an outlet of said manifold and including an outlet port adapted to be in fluid communication with the powder application device and a conveying fluid inlet adapted to be in communication with a source of pressurized conveying fluid; and a color change valve block operably interconnected to said manifold for selectively providing fluid communication between one of a plurality of powder paint sources and said manifold;

wherein a flow of conveying fluid through said pump provides a suction force through said manifold for drawing a volume of powder paint from one of said plurality of powder paint sources through said color change valve block.

2. The powder paint color changer of claim 1, wherein said color change valve block comprises:

a plurality of change valves each having an outlet in fluid communication with the interior cavity of said manifold and each having an inlet in fluid communication with a corresponding source of powder paint, whereby each change valve is operable to selectively enable fluid communication between said inlet and said outlet.

3. The powder paint color changer of claim 2, wherein said color change valve block further comprises:

a plurality of purge valves, each corresponding to one of said plurality of change valves, each of said purge valves including an outlet in fluid communication with the inlet of said corresponding change valve and further including an inlet and a purge port, said purge port in fluid communication with a source of cleaning fluid; and a plurality of color valves, each corresponding to one of said plurality of purge valves, each of said color valves having an outlet in fluid communication with the inlet of said corresponding purge valve and having an inlet in fluid communication with a source of powder paint, whereby each color valve is operable to selectively enable fluid communication between said corresponding purge valve and said source of powder paint.

4. The powder paint color changer of claim 1, wherein said manifold further comprises a cleaner valve coupled to said manifold inlet and operable to selectively enable fluid communication between said manifold and said source of cleaning fluid.

* * * * *